United States Patent [19]

Ujiie

[11] Patent Number: 4,916,479
[45] Date of Patent: Apr. 10, 1990

[54] PHOTOGRAPHIC PRINTER-PROCESSOR

[75] Inventor: Yoichi Ujiie, Kanagawa, Japan

[73] Assignee: Fuji Photo Film Co., Ltd., Kanagawa, Japan

[21] Appl. No.: 315,869

[22] Filed: Feb. 27, 1989

[30] Foreign Application Priority Data

Feb. 26, 1988 [JP] Japan .................................. 63-43450

[51] Int. Cl.$^4$ ............................................. G03B 29/00
[52] U.S. Cl. ...................................................... 355/28
[58] Field of Search .................................... 355/28, 29

[56] References Cited

U.S. PATENT DOCUMENTS

| | | | |
|---|---|---|---|
| 4,260,234 | 4/1981 | Burton | 355/28 X |
| 4,447,146 | 5/1984 | Kogane et al. | 355/28 |
| 4,697,918 | 10/1987 | Kogane et al. | 355/28 X |
| 4,723,153 | 2/1988 | Kogane | 355/28 X |
| 4,837,601 | 6/1989 | Nakane et al. | 355/28 |

Primary Examiner—Richard A. Wintercorn
Attorney, Agent, or Firm—Sughrue, Mion, Zinn, Macpeak & Seas

[57] ABSTRACT

A printer-processor has a printing section for exposing images onto a part of a strip of photographic paper, a cutter for separating the exposed part from the strip to form a sheet, and a processing section for developing the sheet. After one printing, the strip is transported by feeding rollers to set an unexposed part of the strip in an exposure state while simultaneously releasing the exposed part from the exposure stage. This transportation is carried out, not immediately after the printing, but at least after a predetermined period from the time the previously-exposed part was cut so that the strip does not overtake the sheet which is being released into the processing section by another feeding rollers. Further, when or just before the strip is transported, releasing means releases nipping of the latter feeding rollers as not to disturb the transportation of the strip.

7 Claims, 2 Drawing Sheets

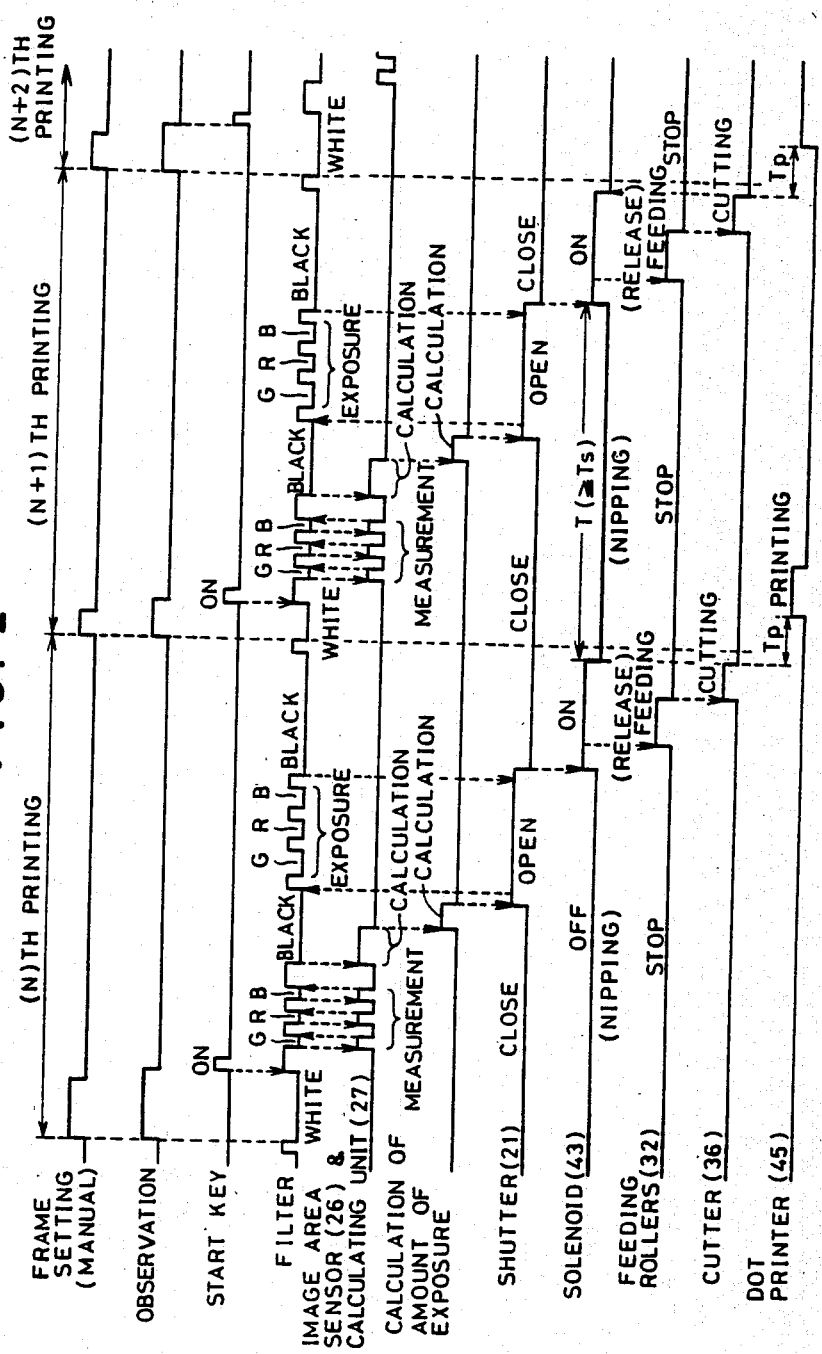

PHOTOGRAPHIC PRINTER-PROCESSOR

BACKGROUND OF THE INVENTION

The present invention relates to a photographic printer-processor and, more particularly, to a photographic printer-processor in which a sheet of photosensitive material is separated into individual frames for photographic processing.

Previous photographic printer-processors have had a printing section for printing images from photographic film onto a strip of photographic material, a cutter for separating an exposed (printed) part from the remaining unexposed sheet, and a processing section for developing the sheet.

In general, printing line-speed is higher than the photographic processing line-speed causing difficulties in the transportation of the exposed photosensitive material from the printing section to the processing section. These difficulties are especially troublesome for a sheet type printer-processor, because it is impossible to avoid completely the interference or overlap between the leading end of the photographic material and the trailing end of the formerly-exposed sheet. When the interference occurs, the photosensitive material may not be properly transported, causing a so-called jamming. Further, if the leading end of the photographic material and the trailing end of the formerly-exposed sheet partially overlap and are transported into the processing section as such, the overlapped part is unevenly developed because of an insufficient contact with a developing solution.

OBJECT OF THE INVENTION

It is therefore an object of the present invention to provide a photographic printer-processor which prevents jamming or uneven development.

SUMMARY OF THE INVENTION

To achieve this and other objects and advantages, a printer-processor is provided with a first feeding means, which is disposed in a printing section, to feed frame by frame a strip of photosensitive material, thereby setting an unexposed part of the strip in an exposure stage of the printing section while simultaneously releasing an exposed part of the strip from the exposure stage. A cutting means is employed to separate the exposed part from the remaining unexposed strip of photosensitive materials forming a sheet. A second feeding means, which is disposed between the printing section and a processing section is used to feed the exposed sheet into the processing section. A releasing means is used to release the nip of the second feeding means while the first feeding means or the cutting means is actuated. Finally, a timing means coordinates the operation by activating the first feeding means a predetermined period after the former cutting operation to avoid interference or overlapping between the leading end of the exposed part of the strip and the trailing end of the formerly cut sheet.

According to a feature of the present invention, the first feeding means provided in the printing section cannot operate to transport the strip until a predetermined period has passed, even though the exposing is finished. Therefore, it is possible to prevent the leading end of the exposed part of the strip from overtaking or overlapping the trailing end of the formerly-exposed sheet, even though the printing line-speed is higher than the photographic processing line-speed. In the processing section, because the space between sheets can be maintained, jamming or uneven development due to overlapping sheets can be avoided.

BRIEF DESCRIPTION OF THE DRAWINGS

These and other objects and features of the invention will be seen by reference to the following description, taken in connection with the accompanying drawing in which:

FIG. 2 is a timing chart illustrating timings of operations of the printer-processor of FIG. 1.

DETAILED DESCRIPTION OF THE INVENTION

Figure 1:
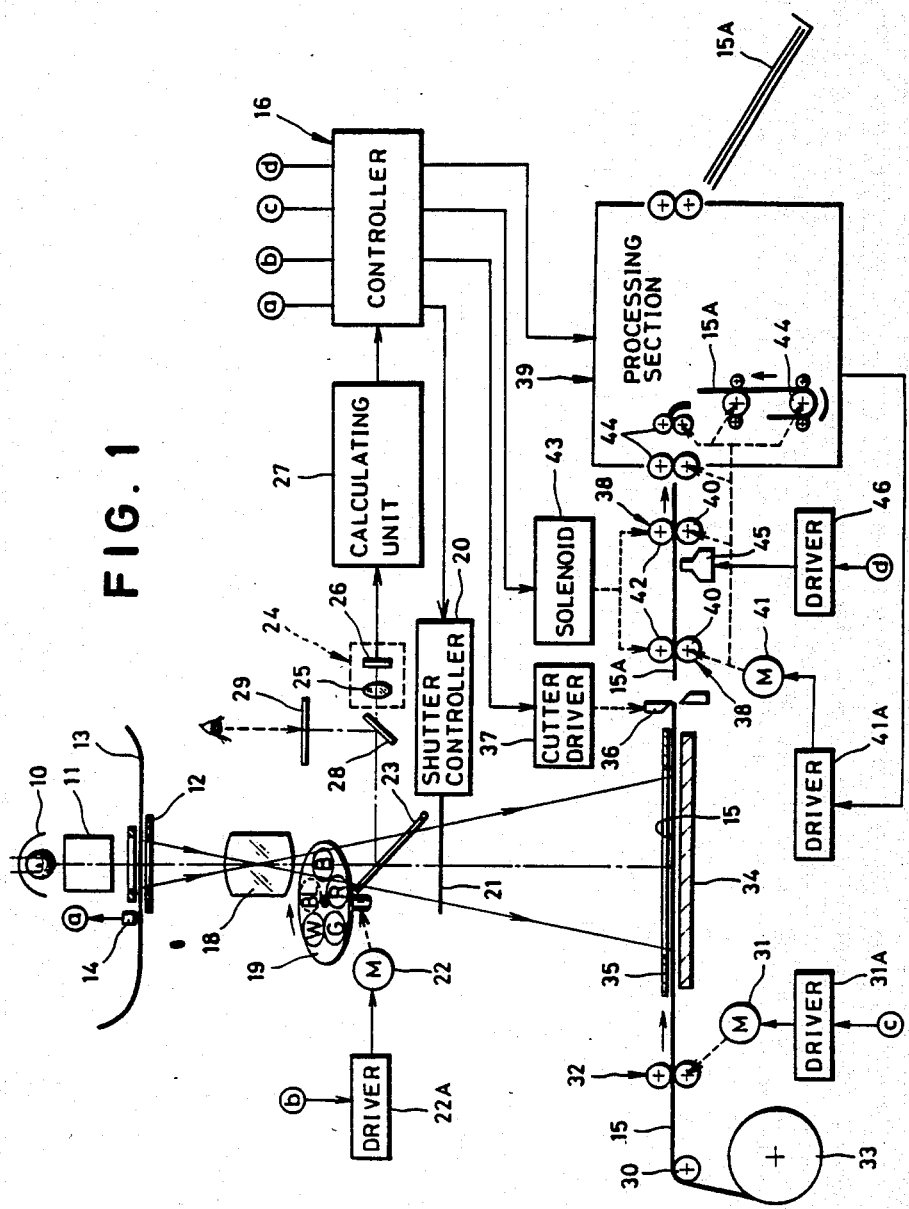
FIG. 1 is a schematic illustration showing a printer-processor according to the present invention.

Referring to FIG. 1, a white light emanating from a light source 10 enters a mixing box 11, which has diffusion plates at the top and bottom and mirrors on the inner surfaces of the side walls, to mix uniformly and diffuse the light used as a printing light for exposure.

Disposed under the mixing box 11 is a film holder 12 in which a piece of negative film 13 having one image or a plurality of images is set to be exposed to the printing light from the mixing box 11 upon printing. The piece of negative film 13 held by the film holder 12 can be manually moved lengthwise and horizontally in order to set a desired image frame at an exposure stage. On one of the marginal edge portions, the negative film 13 has a bar code (not shown) printed at a fixed pitch, each representing the frame number. To read this bar code photoelectrically, a bar-code reader 14 is disposed just above the film path of the film holder 12. The data obtained by this reading is sent to a controller 16 to be used for printing the frame number on the back of an exposed photographic material, such as photographic paper 15.

In a printing optical path of the printing light emanated from light source 10, a printing lens 18 is provided under the film holder 12 to magnify and project an image of the negative film 13 onto a photosensitive surface of the photographic paper 15. Under the printing lens 18, a filter turret 19 for successive additive exposure, a shutter 21, and a shutter controller 20 are provided. The filter turret 19, made of an opaque plate, is sectorially divided into five portions: a white portion (W), a green portion (G), a red portion (R), a blue portion (B), and a black portion (BL). The black portion (BL)—indicated by a dotted line in FIG. 1—is used for shutting off the printing light. The remaining four portions have their respective openings, in which the green portion (G) has a green filter, the red portion (R) has a red filter, the blue portion (B) has a blue filter and the white portion (W) is without a color filter. The filterless white portion (W) is used for passing the printing light as a white light for observation. The filter turret 19 is turned by a motor 22 which is controlled by a controller 16 through a driver 22A. By turning the filter turret 19, any of the five portions of the filter turret 19 can be set in the printing optical path.

To photometer a frame of negative film 13, a mirror 23 is inserted under the filter turret 19 into the printing optical path to reflect the printing light perpendicularly (rightwardly in FIG. 1) onto an image scanner 24, comprising a lens 25 and an image area sensor 26, to measure the intensities of the incident light for each sensing element of the image area sensor 26, and for each color corresponding to each color filter. These intensities are measured by setting one of the three color filters of the filter turret 19 successively in the optical path. For each of the three colors, measured values are sent to a calculating unit 27 to calculate the characteristic values of the frame's image, such as large area transmittance density (LATD), maximum and minimum transmittance densities, and average transmittance densitites of specified areas of the frame. The calculated charcteristic values are sent to a controller 16 to determine the amount of exposure for each color of the frame to be printed. Between the mirror 23 and the image scanner 24, a half-mirror 28 is disposed to reflect partially the light to a screen 29, on which an image is formed for observation of the frame set in the film holder 12. This observation is necessary to position the frame properly in the printing optical path and to check the color balance and density of the frame. During the observation, the white portion (W) of the filter turret 19 is set in the printing optical path to pass the light without coloring. In addition, a video camera and a CRT may be used for the observation in place of the screen 29.

A strip of photographic paper 15, having a length sufficient to include one image frame, is withdrawn from a roll 33 by means of a guide roller 30 and a pair of feeding rollers 32. A pulse motor 31 drives the feeding rollers 32 at a controlled rate that allows an unexposed part of the photographic paper 15 to be set on an exposure stage 34 while simultaneously releasing an exposed part of the photographic paper 15 from the exposure stage 34. The pulse motor 31 is controlled by the controller 16 through a driver 31A. Due to deaeration from the back of the photographic paper 15, the unexposed part of the photographic paper 15 adheres to the surface of the exposure stage 34; thus a mask 35, is pressed downward to hold the photographic paper 15 flat and in a fixed position.

A cutter 36 is provided between the exposure stage 34 and the processing section 39 to cut the exposed part from the unexposed part of the photographic paper 15, thereby forming a sheet 15A which has one latent image. The cutter 36 is controlled by the controller 16 through the cutter driver 37.

After the cutting, the sheet 15A is sent to the processing section 39 by two pairs of feeding rollers 38 which are disposed with a separation suitable for holding the sheet 15A. Each pair of feeding rollers 38 comprises a drive roller 40 and a pinch roller 42. A solenoid 43, which is controlled by a controller 16, is excited in order to release the nipping of the feeding rollers 38 by lifting the pinch rollers 42 just before the feeding rollers 32 begin feeding the photographic paper 15, and then de-excited after the operation of the cutter 36. The drive rollers 40 are driven at a constant rotational speed during processing by a motor 41, which is connected to a control circuit (not shown) of processing section 39 through a driver 41a.

In FIG. 1, the motor 41 is positioned outside of the processing section 39 for explanatory convenience. However, the motor 41 is actually housed within the processing section 39 in which the exposed sheet 15A is continuously transported for application of various processing. The processing section 39 has baths (a color-developing bath, a bleaching-fixing bath, and a rinsing bath) and a drying unit. Although processing section 39 contains many pairs of transporting rollers 44, only a few are illustrated in FIG. 1. The rollers in the processing section 39 are all driven by the motor 41 at a constant line-speed to transport continuously the sheet 15A through each of the processing baths and units. A second motor may be used to drive the rollers 44 in the processing section 39, leaving motor 41 to drive only the feeding rollers 38, so long as both motors rotate at the same speed. In addition, it is sufficient to rotate the motor 41 only during a nipping state of the feeding rollers 38.

To print a frame number on the back of the sheet 15A, a dot printer 45 having a line of printing pins is disposed between the two pairs of feeding rollers 38. The dot printer 45 is controlled by the controller 16 through a driver 46 and prints a frame number according to the data from the bar-code reader 14.

The operation of the embodiment will now be explained in accordance with FIG. 1 and FIG. 2—which shows the timing of each component. The lead end of a negative film 13 is inserted into the film holder 12 and set to a desired frame in the printing optical path. The white portion (W) of the filter turret 19 is previously set in the optical path and a mirror 23 is inserted into the optical path to project an image onto a screen 29 for observation. According to this observation, manual color correction, if necessary, is performed by entering data through a keyboard (not shown) to the controller 16.

After the observation, a start key (not shown) is depressed to print the desired frame on the photographic paper 15. First, controller 16 rotates the filter turret 19 to position successively the three color filters in the optical path. The scanner 24 measure the incident light intensities for each color correponding to the color filter positioned in the optical path. According to the mesurement of the scanner 24, the calculating unit 27 calculates the characteristic values for each color which the controller 16 uses to determine the amount of exposure, or successive additive exposure, for each color of the frame.

Thereafter, the controller 16 removes the mirror 23 from the printing optical path and opens the shutter 21 through the shutter controller 20. Then, controller 16 successively positions green, red and blue filters of the filter turfet 19 in the printing optical path for a time according to the amount of exposure for each color. Thus, the three exposures print an image on part of the strip of the photographic paper 15. After the exposures, the black portion (BL) of the filter turret 19 is set in the printing optical path and the shutter 21 closed.

Following the printing, and after a predetermined period (to be described later) has passed from the time of the previous cutting operation, the controller 16 lifts the pinch rollers 42 by exciting the solenoid 43, thereby releasing the nipping of the feeding rollers 38. During this releasing state, the controller 16 drives the pulse motor 31 through the driver 31A to rotate the feeding rollers 32, thereby feeding the photographic paper 15 by one latent image. The exposed part of the strip of the photographic paper 15 is placed on the two lower feeding rollers 40, as shown in FIG. 1, and cut by cutter 36 at the left side of the latent image plus its margin, forming a sheet 15A.

When this cutting is finished, the solenoid 43 is de-excited in order to lower the pinch rollers 42 towards the drive roller 40, bringing the feeding rollers 38 into a nipping state. Hence, the sheet 15A begins to be fed to the processing section 39. In synchronization with feeding, the frame number of the latent image is printed on the back of the sheet 15A by the dot printer 45 as controlled by the controller 16 through a driver 46. As shown in FIG. 2, the frame number is printed after a predetermined period $T_P$ has passed from the time of the cutting because the number is preferably printed at a fixed position on the back of the sheet 15A.

After the operation of the cutter 36, the mirror 23 and the white portion (W) of the filter turret 19 are once again set in the optical path for observation of the next frame to be printed. By observing the screen 29, the desired frame of the negative film 13 is properly set and the start key depressed. Accordingly, the next printing commences.

Usually, the processing line speed is so much slower than the feeding speed, that the leading end of the strip of the photographic paper 15 may overtake the sheet 15A. The controller 16 measures a period T from the time of former cutting of the photographic paper 15 (or from the start time of the former feeding of the sheet 15A) by counting clock pulses with a timer therein. Until the period T reaches a predetermined minimum period $T_S$, the controller 16 cannot order the excitement of the solenoid 43 to begin feeding the photographic paper 15 with the feeding rollers 38 even though the printing by this time has finished. The predetermined period $T_S$ considers the processing line speed $V_1$ of the processing section 39 and the feeding speed $V_2$ of the feeding rollers 32 and is described by the following relation:

$$T_S = ((L_0 + L_1)/V_1) - (L_0/V_2) - T_C$$

where $L_0$ is the length of the sheet 15A, $L_1$ is the distance between the trailing end of a preceding sheet 15A and leading end of a succeeding sheet 15A, and $T_C$ is a period necessary to cut the photographic paper 15. Under the condition described above, the photographic paper 15 is not fed by the feeding rollers 32 before the predetermined period $T_S$ passes; rather, it is on standby. Hence, the leading end of the strip of the photographic paper 15 never interferes with the preceding sheet 15A, preventing the jamming or overlapping of sheets 15A.

In the above embodiment, to ensure that the jamming or overlapping of sheets 15A is avoided, the two pairs of feeding rollers 38 is released from the nipping state just before the photographic paper 15 is fed by feeding rollers 32. However, a check on whether the predetermined period $T_S$ has passed is carried out before the nipping is released, and not before the feeding of the photographic paper 15. Strictly, $T_S$ may have a short period between the time of nipping and the start of the feeding. If the nipping of the feeding rollers 38 can be released in an extremely short period, the feeding may be done at the same time of the releasing. In this case, with respect to the start of the feeding of the photographic paper 15 by the feeding rollers 32, the check on whether the predetermined period $T_S$ has passed is carried out.

If one of the two pairs of feeding rollers 38 is disposed on the right side of the exposure stage 34 and the other is disposed on the left side, the cutter 36 may be provided between the exposure stage 34 and either one of the pairs of feeding rollers 38.

Further, instead of feeding rollers 32 and 38, pairs of feeding belts may be used as feeding means for the photographic paper 15 and the sheet 15A.

Still further, though printing is performed by the successive additive exposure in the embodiment, substractive exposure may be adapted.

Obviously many other modifications and variations of the present invention are possible in the light of the above teachings. It is therefore to be understood that within the scope of the claims in the invention may be practiced otherwise than as specifically described.

What is claimed is:

1. A printer-process having (1) a printing section for successively exposing a plurality of original images on correspondingly successive parts of a strip of photosensitive material which are successively placed in an exposure stage of the printing section and (2) a processing section for succesively developing the exposed parts of the photosensitive material, said printer-processor comprising:

first means capable to feed the strip intermittently at a first speed by a length corresponding to one image of the said original after each printing in order to place an unexposed part of the strip in the exposure stage and release an exposed part of the strip from the exposure stage at the same time;

cutting means operable to cut the strip in order to separate the exposed part from the unexposed part, thereby forming a sheet which includes the exposed part;

second means operable to feed the sheet into the processing section, after said cutting, at a second speed which is lower than said first speed, and said second means having a nipping state to nip the sheet and a releasing state to release the sheet;

releasing means operable to set second means in said releasing state at least while one of said first feeding means and said cutting means is operated; and controller means for controlling said first feeding means not to operate until a predetermined period passes from a time when said cutting means last operated time, so that the strip does not overtake the sheet being fed into the processing section.

2. A printer-processor as claimed in claim 1, wherein said sheet is transported at a constant line-speed in the processing section, and said first speed is equal to the line-speed of the processing section.

3. A printer-processor as claimed in claim 2, wherein said second feeding means comprises a drive roller which is continuously driven, and a pinch roller which is separable apart from said drive roller by operation of said releasing means so as to establish said releasing state.

4. A printer-processor as claimed in claim 3, wherein said controller means causes said releasing means to operate after confirmation that said predetermined period has passed and causes said first feeding means to operate at the same time or immediately after the releasing means is operated.

5. A printer-processor as claimed in claim 4, wherein, when $T_S$ represents said predetermined period, said predetermined period $T_S$ is given by $$T_S = ((L_0 + L_1) - (L_0/V_2) - T_C$$

where
$L_0$ is a length of the sheet,
$L_1$ is a distance between a trailing end of one sheet and a leading end of the next succeeding sheet,
$V_1$ is a line speed of the processing in the processing section,
$V_2$ is a speed of the feeding of the first feeding means, and
$T_C$ is a period necessary for the cutting of the strip.

6. A printer-processor as claimed in claim 5, wherein said releasing means includes a solenoid.

7. A printer-processor as claimed in claim 6, wherein, said controller means comprises a timer means for measuring said predetermined period $T_S$.

* * * * *